United States Patent [19]
Whitesides

[11] Patent Number: 5,881,970
[45] Date of Patent: Mar. 16, 1999

[54] LEVITY AIRCRAFT DESIGN

[76] Inventor: Carl Wayne Whitesides, 18975 Symeron Rd., Apple Valley, Calif. 92307

[21] Appl. No.: 434,981

[22] Filed: May 4, 1995

Related U.S. Application Data

[63] Continuation-in-part of Ser. No. 54,017, Apr. 29, 1993, abandoned.

[51] Int. Cl.$^6$ ............................ B64C 29/04; B64C 15/02; B64B 01/36
[52] U.S. Cl. .................... 244/23 C; 244/23 D; 244/12.2; 244/52
[58] Field of Search ................................ 244/23 R, 23 C, 244/52, 12.2, 12.5, 73 B, 23 D

[56] References Cited

U.S. PATENT DOCUMENTS

| | | | |
|---|---|---|---|
| 3,020,002 | 2/1962 | Frost | 244/23 C |
| 3,020,003 | 2/1962 | Frost et al. | 244/23 C |
| 3,123,320 | 3/1964 | Slaughter | 244/23 C |
| 3,519,244 | 7/1970 | Boyd et al. | 244/23 C |
| 4,773,618 | 9/1988 | Ow | 244/23 C |
| 4,796,836 | 1/1989 | Buchelt | 244/23 C |
| 5,039,031 | 8/1991 | Valverde | 244/23 C |
| 5,351,911 | 10/1994 | Neumayr | 244/23 C |

Primary Examiner—Verna Lissi Mojica

[57] ABSTRACT

An aircraft with automated means to transport. Spherical or one of its segments, without airfoils for lift or guidance. Means for flight are housed within the aircraft. The outermost surefrace is configured to disrupt the air-flow, over its surfaces, in flight. This, to reduce skin-friction and drag coefficients, and mollify heat build-up on the skins outer surfaces as speeds increase to and beyond mach 1. The weight of gas per unit volume, with temperature variations, is the means to reduce the gross-weight and adjust for temperature and weight changes during flight. Propulsion, within the propulsion component, is provided by turbojet engines. They are secured within an inner compression pod and an outer combustion pod. The compression pod and the attached vertical-air-duct, rotate through three hundred sixty degrees, as the means for directional guidance and direct thrust. Augmented power-thrust-tubes extend outward from the combustion pod to the mid-horizontal circumference of the aircraft. Control baffles, on each thrust-tube, check, deflect and regulate the engines' thrust to control the motivity of the aircraft. Struts retract for flight and are extended for landing. These electro-hydraulic struts, level, raise and lower the aircraft for direct ground level support operations. The aircraft has the means to maintain a horizontal flight attitude. For flight aptness the aircraft has an internal, mechanical and scientific means, for vertical ascent and vertical descent without horizontal motivity, to hover and maintain a position and altitude. And during horizontal flight, climb and descend, and perform heading changes. These flight means are all performed in the aircrafts' horizontal attitude.

14 Claims, 5 Drawing Sheets

LEVITY AIRCRAFT DESIGN

CROSS-REFERENCE TO RELATED APPLICATION

This application is a continuation in part submitted by the inventor Carl Wayne Whitesides serial number 08/054,017 filed Apr. 29, 1993 now abandoned.

Enclosed was the return receipt (photo-copy) that the PTO received the CPI Feb. 15, 1995 and because it was incomplete or deficient it was not officially filed but was "deposited". The PTO did not send me a letter stating the deficiency in the application or tell me to promptly remedy it.

The next communication I received from the PTO was "Notice of Abandonment" dated Feb. 15, 1995 of the original application 08/054,017 filed Apr. 29, 1993. This abandonment notice can avoid possible DP if this CIP is treated as a new application and is allowable.

I have the filing receipt for the CIP dated Aug. 25, 1994 by the PTO therewith my CIP application is officially "patent pending".

Statement as to Rights to invention made under Federally sponsored research and development: No agency funds or other considerations were involved in making or on the conception of the invention. That I made and conceived this invention on my own time using only my own facilities, equipment, materials, funds, information and services.

BACKGROUND OF THE INVENTION

Description of the Prior Art

Human advances in the art of flight is the product of machines. Machines are devices for accomplishing a task. They usually involve some activity of motion that is performed by working parts.

In general, aircraft gain motivate and fly using articles of manufacture. Different kinds of aircraft have different capabilities, and different user purposes require different capabilities. Certain capabilities exclude others, so that every design is a collection of compromises.

By official designation there are four categories of aircraft; lighter-than-air, gliders, rotor-craft, and airplanes. Aerodynamics and structural considerations for all these categories of aircraft, with the exception of lighter-than-air machines depend upon airfoil's for lift.

Lift required to raise and fly an aircraft is the product of aerodynamics that mathematically resolve the effects of lift, drag, thrust, and weight. By definition, lift forces act perpendicular to the relative wind. Drag forces act in parallel to the relative wind. Thrust forces usually act in parallel to the line of flight. Weight always acts in the direction of gravity. To simplify, for this exercise, an airfoil is any surface that is designed to obtain lift from the air through which it moves.

Ranges of speeds that must be considered is divided into four speed categories. These are denoted successfully as; subsonic, transonic, supersonic, and hypersonic. Each denote a speed range, within which aerodynamic design problems differ and require different resolutions. Aerodynamic designed airfoils for each denoted speed range are ingredients of both engineering and compromises, when fabricating machines for flight.

The earliest desires of man to fly in machines were thwarted by the lack of sufficient means of propulsion. Engine thrust to weight ratios have been developed, and the art of engine propulsion has now exceeded the art of airfoil design and usefulness. And we can now ask; do we need airfoils to fly?. As these powerful engines are developed and become available, many aircraft fabricated parts have to be changed and additional fabricated parts added, to aircraft, to compensate and overcome unsafe flight characteristics. There is increased air-friction and air-pressure, vortex anomaly and sound wave encounters, as airspeeds increase to mach I and beyond. Some of the aircraft fabricated parts that are used for lift and guidance are; propellers, rotor-blades, ailerons, rudders, elevators, wing-flaps, spoilers, trim-tabs. All these are attached and coupled by mechanical and electronic means to control their functions from within a control center.

Aircraft flight control systems generally operate and control aircraft around two axes; the vertical axis for horizontal control, and the horizontal axis for vertical control. Coordinated movements of these control surfaces are required to effect smooth flight maneuvers, through the air. To guide an aircraft, in flight, they are maneuvered into unusual attitudes. An unusual attitude is a change from the horizontal plane perpendicular to the earth's gravitational pull. These unusual attitude changes, increase stress upon the aircraft's structure the flight crews, as well as the passengers and effect the safety of the aircraft.

The gross weight of an aircraft is a means to determine the engine propulsion that is require for its motivity. As the gross weights of aircraft's increase engine propulsion increases are required to lift and fly these machines. At some point, in aircraft development, weight limits and propulsion requirements go beyond the economic feasibility to lift and fly these machines. This invention addresses these disadvantages and compromises, by introducing an alternative means for machine flight.

This invention is a powered-heavier-than-air machine. That can ascend and descend vertically under precision control without the need for airfoil designs, for lift or guidance. After the successful use of internal combustion engines in aircraft, another thirty years were required to solve the problems of controlling rotor-craft as a zero horizontal speed take-off and vertical landing machine. The rotor-craft uses airfoil designed rotor-blades to provide lift and guidance.

This invention addresses a multitude of means to change the way we fly, and introduces a machine for flight that will solve many current aviation problems as we move aviation into a more meaningful future. All flight movements such as vertical ascent and descent are continually being considered for development in many forms and shapes of machines for flight. The uses of airfoil flight seems to be the main direction for these developments, as opposed to the elimination of airfoils for lift and guidance. Aircraft using airfoils for lift and guidance have excessive weight problems to overcome, as well as the elimination of external structures attached to the main fuselages of these airplanes.

A means to lower an aircraft to ground level for ground support services would be an advantage. Some military aircraft require little terminal ground support means. However; flight crew personnel fly with the aircraft and are trained to provide ground and flight support needs. Commercial aircraft operators use motorized ground support machines, in conjunction with especially designed terminal settings, to fulfill these commercial transport needs.

The flight and ground functions of this invention, with automatic means to transport will reduce air terminal congestion and many other problems. It will move air commerce into additional locations, away from the present terminals, located near major cities. This flying machine will support the expanding world population and fulfill their needs, as opposed to the economic and social inconveniences, of fixing an old inadequate system of transport, by air.

This aircraft with automated means to transport eliminates the use of airfoil designs for lift and guidance. It replaces the need for airfoils, that are replaced with engine propulsion means within this new aircraft design.

Objects and Advantages

Accordingly, besides the objects and advantages of these different kinds of aircraft, they have different purposes that require different capabilities. Certain capabilities exclude others so that every design is a collection of compromises. Each aerodynamic airfoil design differs and requires different resolutions. To reduce these compromises and resolutions, several objects and advantages of the present invention are:

(a) to provide a structure for the spherical aircraft design by assembling the major design components;

(b) to provide a lift component to regulate the lifting force, within the lift component, to oppose the force of gravity, (c) to provide a propulsion component with turbojet engines secured within an inner compression pod and an outer combustion pod;

(d) to provide a pressurized transport component that forms the bottom portion of the spherical aircraft that contains windows, doors, and a flight control center, (e) to provide the means to reduce the gross weight of the aircraft by the elimination of airfoil components for lift and guidance;

(f) to provide an outer surface designed and configured to disrupt the air-flow over its surface during flight;

(g) to provide the means to fly, maintaining a horizontal attitude perpendicular to the earth's center of gravity while performing all patterns;

(h) to provide an internal guidance means to change headings, ascend and descend vertically and eliminate attitude changes that deviate from the horizontal attitude;

(I) to provide struts with a wheel-less means for landing, that retract for flight and extend for landing, these located on the underside of the spherical aircraft;

(j) to provide electro-hydraulic landing struts to raise, lower, and change the posture of the aircraft while in the landing configuration, on the ground.

(k) to provide a means to lower the aircraft to the ground level to on-load or off-load personnel and cargo, by the means of the electro-hydraulic struts;

(l) to provide the means to change the red and green navigation lights to indicate the direction of flight, the spherical aircraft has neither a built-in front nor back and can move in any compass-card direction by rotation of the internal engines thrust;

(m) to provide internal lift within the lift component plus propulsion from the propulsion component, these two means eliminate loss of altitude during wind shear encounters, that changes the air-flow over the airfoils and eliminates the lift factor;

(n) to provide a means to perform preventative and major maintenance, by detaching the transport component from the air-frame, thus gaining access into the interior where the major components are located.

Further objects and advantages of the lift component is to decrease and regulate the gross-weight of the aircraft, prior to lift-off for flight, then continue to control this factor during flight. As a result; an increase in the payload, an increase in speed and range of a flight, a reduction in engines size and propulsion requirements, and reduced fuel consumption. Still further objects and advantages will become apparent from the ensuing descriptions and drawings.

SUMMARY OF THE INVENTION

The elimination of airfoil designs for lift and guidance; a means to decrease and regulate the gross-weight, of the aircraft, prior to lift-off for a flight and maintained during flight; an outer skin design to disrupt the air-flow during flights; to maintain a horizontal attitude during all flight requirements; an internal flight control means that eliminates unusual flight attitudes; to hover over a fixed position; perform vertical ascents and descents; during flight to proceed, stop, and fly in any compass-card direction using internal means for control and guidance; a decrease in engine size and propulsion requirements; a decrease in fuel consumption; an increase in useful-load capacities; an increase in flight ranges and speed; a means to lower, raise, and level the airframe to adjust to a variety of operational requirements; a means to detach the transport component in order to gain access into its interior, for maintenance.

It being understood that the invention is not restricted to the details of the illustrated art work and described embodiments but it is susceptible to modification and adaptations.

The file of the patent contains at least one drawing executed in cold.

DETAILED DESCRIPTION

Definition of spherical, is having the form of a sphere or one of its segments. The levity aircraft design is spherical or one of its segments. It has no airfoils or external moving parts, configured to its exterior and used for lift or guidance. The landing struts extend and retract. The propulsion to fly and operate the spherical aircraft's turbojet engines. These are located internally and contained within an inner compression pod and an outer combustion pod, and these contained within the propulsion component.

There are three major design components with internal sub-components. The three major components are; a lift component, a propulsion component with engines and the means to extend the propulsion for flight, and a pressurized transport component that contains a flight control center. Some of the sub-components are; a master flight attitude gyro, auto-pilot, computers, instrument panels, flight controls, communication and engineer consoles. The spherical aircraft is designed and crafted with titanium and heat resistant metals. And heat resistant carbon composite materials or their equivalents.

The turbojet engines provide two sources of energy. Compressed bleed-air from the compression pod, and propulsion thrust from the combustion pod. The lift component gets hot bleed-air from the engine's high-pressure-tap, within the compression pod. The bleed-air is diluted with ambient air and ducted into the lift component where it is contained and controlled for temperature and pressure. The pressure is controlled with pressure-relief valves. The hot air, contained within the lift component, produces a vertical lifting force that opposes the force of gravity. The lift factor is controlled with a continuous mixture of heated and ambient air. A computer sensor controlling this factor, measures the differential air temperatures using the ambient air temperature and the heated air temperature within the lift component. The controlled lift factor, decreases the gross-weight of the aircraft prior to lift-off and during a flight. This weight reduction is new in the art to which this invention pertains.

A gross-weight reduction mollifies the size of the engines and the propulsion required to fly and operate the aircraft. In present airplanes, that use airfoils for lift, eighty percent of the engine's propulsion energy is expended to overcome lift, weight, and drag. Thus twenty percent remains for flight propulsion. In this invention, lift, weight, and drag are reduced to allow less energy to overcome these three factors and increase the amount of propulsion energy available for flight propulsion.

The propulsion engines, the vertical air-duct, the augmented power tubes, and the flight control baffles, are additions and extensions that are fabricated into the propulsion component. The propulsion component center, is located at the horizontal center of the spherical aircraft and below the vertical center for proper weight distribution. The vertical air-intake duct that is attached to the compressor pod, is the means of ambient air source needed to operate the engines. The vertical tube extends upward to the top of the horizontal center of the spherical aircraft. The compression pod and the vertical air-duct rotate through three hundred sixty degrees, clockwise or counter-clockwise. This rotation is controlled within the flight control center and provides the internal means for flight guidance. Rotating the engines, eliminates the need to turn the aircraft when changing directions. Thus . . . turn the engines for direction changes and not the aircraft. The spherical aircraft can proceed in any compass-card direction, without turning, as there is neither front nor rear configured into the design. The engines can be rotated to provide direct thrust for controlled flight. Aircraft flight configurations changes are not required to climb and descend during controlled flight. A flight configuration change is required for; vertical ascent, vertical descent, hovering, horizontal airframe rotation either clock-wise or counter clock-wise. Again, all maneuvers are executed, maintaining the horizontal flight attitude.

The power thrust tubes that duct the engine thrust are extended from the outer enclosure, called the combustion pod that is outside but not attached to the compression pod. The combustion pod enclosure contains and directs engines' turbojet thrust, that exits through the augmented power thrust tubes. These tubes extend to the mid-circumference spar of the spherical aircraft. Each tube has an augmented (after-burner). At the exit end of each power thrust tube is a thrust control baffle. These baffles are controlled by servo wheels, these move the baffle control gates with signals from the master gyro computer and the auto-pilot. These baffles check, deflect, and regulate the thrust that exits from the power thrust tubes. This controlled energy provides the motivity for operating and flying the spherical aircraft.

For flight in a cruise configuration, the air-intake-duct and the engines' compressor pod are rotated, horizontally, to provide optimum thrust and airspeed in the direction of flight. The control baffles maintain attitude, altitude, stabilization, and directional control of the aircraft during a flight. In the direct thrust configuration, the aircraft easily reaches speeds up to mach I and beyond.

The thrust, from the engines, through the power thrust tubes is controlled at the circumference of the aircraft by the control baffles. These baffles are made from titanium and operate individually to maintain the envelope of flight. The baffles can operate from fully closed to fully open. They each function from a fully closed position to sixty degrees each side of their horizontal center. By deflecting and regulating the engines' thrust, the baffles are controlled to stabilize the aircrafts' horizontal attitude, perpendicular to the earth's' gravitational pull. These baffles deflect the thrust and move the aircraft to ascend and descend at a controlled rate, correcting for wind-drift. Rotating the aircraft at a controlled rate clock-wise or counter clock-wise. Fly on course with the capability to climb or descend. Hover at an assigned fix while maintaining altitude and attitude. In all flight configurations the aircraft is controlled with mechanical and scientific exactness using the means defined within this invention.

The spherical aircraft is equipped with red and green navigation lights that denotes flight direction. A computer makes their adjustments according to the flight direction. The aircraft has strobe lights, on top and on the bottom as well as landing lights for night operations.

Wheel-less, break-less landing struts are located at the bottom of the aircraft, near the lower circumference. These struts are configured into the skeletal main frame spars and are not configured as part of the pressurized transport component. The operation of the landing struts are controlled from the flight control center. They can be used to level the airframe after landing if the ground is not level. The struts can be activated to lower the airframe to ground level for the convenience for loading or un-loading passengers or air cargo.

The pressurized transport component is the bottom portion of the spherical aircraft. It can be removed from the aircraft, when it is on the ground, to provide access into the interior of the aircraft. This allows access to conduct engine changes, maintenance, repairs, and safety inspections. The pressurized component has windows to provide visibility from within the passenger compartment. An airstair door and ramp provides a means for entering and exiting the transport component.

The spherical aircraft can be engineered and configured to meet specific weight-lifting and speed requirements, without changing the operational characteristics. This is accomplished by changing the horizontal circumference diameter, or the vertical diameter or both, and still be spherical within this inventors definition of spherical. Engines' propulsions can be increased or decreased to meet these specific configuration requirements.

The motivity of the spherical aircraft 20 is controlled from the flight control center 58–68 located within the pressurized component 56. A flight control center 58–68 fully equipped to provide a flight crew with control pedestals 58–68 that operate the controls of the aircraft 20. A flight control center 58–68 equipped with flight crew seating locations. The aircraft 20 does not require feet controls. A command pilots' pedestal 58–68 that has engines' 60 control levers and automatic-pilot controls 58–68 with manual over-rides to manage a cybernetic complex of electronic parts 58–68. Flight instrument panels 58 68, communication panels 58–68, engineers' panel 58–68, communication equipment control panel 58–68, therein the engineers panel and pedestal 58–68 to monitor the functions of the entire spherical aircraft 20.

A flight crew, in place, to perform the required procedures to prepare the aircraft 20 for flight. A flight computer 58–68 communicates the flight requirements in response to the flight crews' input. The items considered before flight is, the gross-weight of the aircraft, pre-measured by computerized scale system that weighs each item as it is ingress into the aircraft 20. These total weights, the weights of the fuel and crew, are fed into the master flight computers 58–68. This gross-weight, and the ambient air temperature 33–35 are the computer functions that provide a resultant temperature factor for the lift component 22. The resultant temperature factor provides lift and reduces the gross-weight of the aircraft 20, prior to a vertical lift-off flight.

When all flight parameters are met, including the vertical altitude and the direction of the flight, the flight crew starts the engines 60. After receiving a clearance for lift-off, the aircraft 20 begins a vertical ascent.

The thrust 62–64 from the turbojet engines 60, exits at the augmented power thrust tubes 60-66-30 outlets that are equally spaced at the outer circumference 38 of the spherical aircraft 20. The control baffles 30 direct the thrust forces 82–84, with signal inputs from the flight control center 58–68. The baffles 30 interact to keep the aircraft 20 in a horizontal attitude while in flight. At full engine 60 thrust 82–84, with augment thrust 66–67, if needed, the control baffles 30 direct the thrust 82–84 downward 80. The downward thrust 80 places a vertical pressure upon the aircraft 20 and the aircraft 20 is forced upward at a controlled rate of ascent. The aircraft's 20 flight movements are detected by the master gyro and compass that provides information to the flight control center 58–68. These electronic signals are sent to the control baffles 30 to correct for wind-drift as the aircraft 20 ascends to altitude.

Upon reaching flight altitude the flight crew 58–68 changes the aircraft 20 to the enroute flight configuration. The aircraft 20 flight heading is signaled and the engine pod 62 and the vertical air intake tube 33–35 rotate to provide direct thrust 80 for the direction of flight. The control baffles 30 are continually activating to keep the aircraft 20 in the horizontal flight attitude as well as changing altitudes during the flight. Direction changes can be made by rotating the engines 60 to effect the desired course.

Upon reaching its destination, the aircraft 20 reduces its speed until it is hovering over a ground fix. At this point the aircraft 20 configuration is changed for descent. To descend, the force of gravity is mollified by the control baffles 30 and the engines 60, to descend vertically at a controlled rate. The landing struts 28 are extended and the engines 60 thrust 80 is used to effect a soft landing. These types of approaches and landings can be made in weather that is zero visibility and or icing conditions. After landing firmly upon the ground, the thrust 80 from the engines 60 is directed upward to hold the aircraft firmly upon the ground. Then the aircraft 20 is leveled by the electro-hydraulic landing struts 28. The engines 60 are shut down and the lift component 22 temperatures are returned to the normal ambient air temperature. At this point the aircraft 20 can be lowered to ground level by activating the electro-hydraulic landing struts 28. The aircraft 20 is now ready for un-loading its passengers 44 and the cargo 52 and is ready for ground servicing. During the un-loading and loading the computer scales record the total weights taken off and brought aboard.

Color video monitoring devices 58–68 within the flight control center 58–68 monitor activities around the aircraft 20. Adverse weather, especially related to wind shear is not an adverse condition for this type of aircraft 20. The spherical aircraft 20 can depart and land vertically, thus ice and snow on runways is not a major problem. Poor visibility and fog conditions do not prevent flight operations and de-icing on the ground and iceing in flight is eliminated because of the heated lift component 22. Navigation systems are now in place that can pin-point the aircraft's positioning in any location to effect safe, and cost effective commercial air transport.

The disrupted air-flow over the outside of the aircraft is a change in concept from airplanes that use airfoils for lift and are not needed for this aircraft. Thus there is a great reduction in the aircraft's' basic weight. Another advantage is that the exterior is designed to disrupt the airflow over its surface 20. This decreases the skin-friction and drag coefficients as the air passes around the aircraft 20 during a flight and has less, rough-air effects in flight, on the aircraft 20. And like a golfball, can move through the air with better air penitration and directional properties.

The propulsion thruster tubes 66 and the flight control baffles 30-82-84-88 have control authority to keep the spherical aircraft 20 in horizontal flight, correcting for wind and weather conditions. To ascend and descend vertically with controlled precision. To change directions without effecting, an unusual attitude. Come to a full stop and hover maintaining its position and altitude and from a hovering position, change the configuration of the aircraft 20 then fly and reach speeds to mach I and beyond.

DESCRIPTION OF THE PREFERRED EMBODIMENTS

Figure 1:
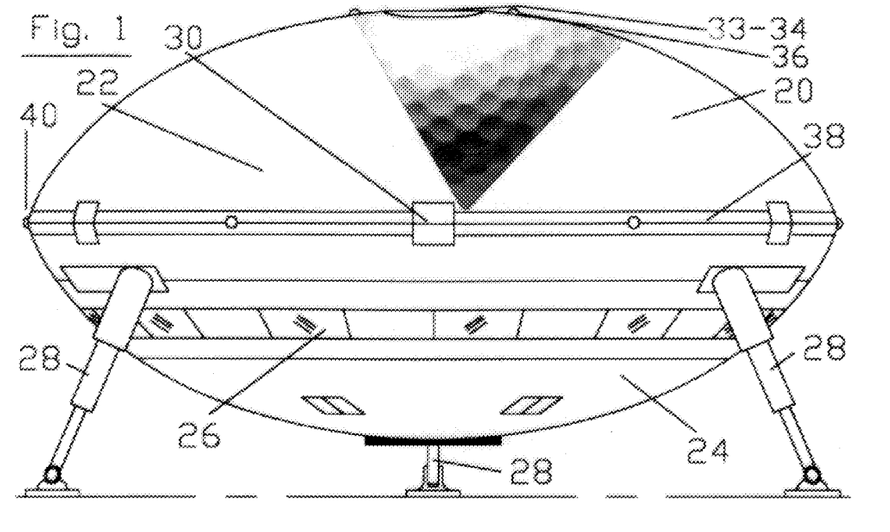
FIG. 1 shows a spherical levity aircraft design sitting on the ground with some visible embodiments and detail of the exterior.
Figure 2:
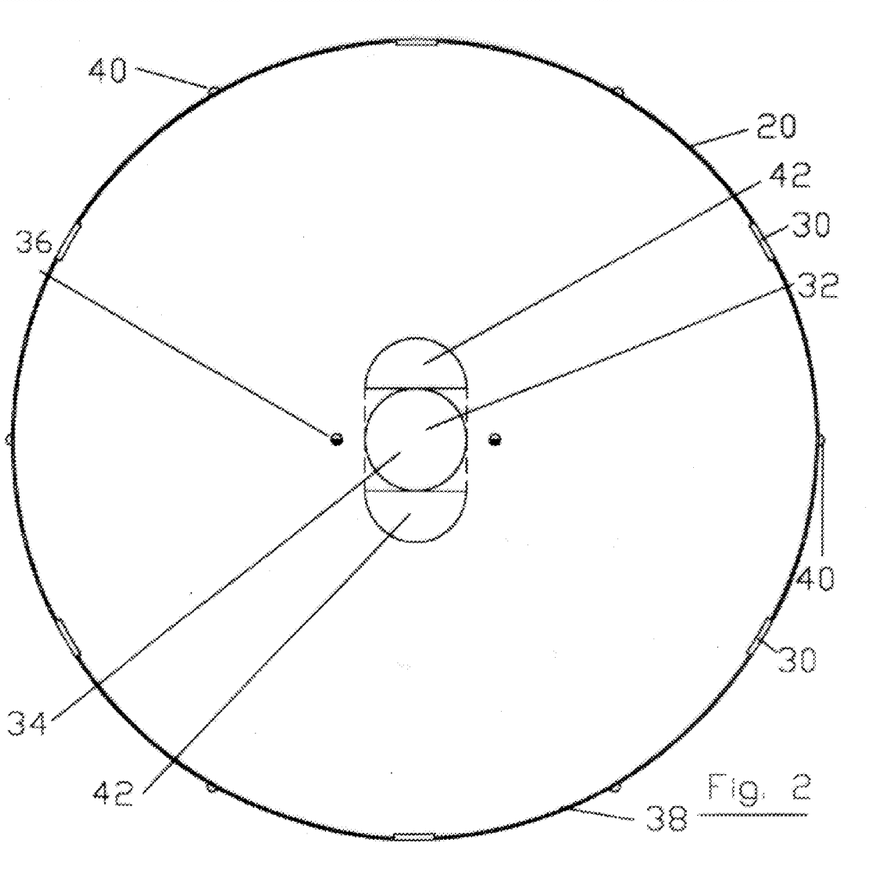
FIG. 2 shows a top view of a spherical levity aircraft design with some exterior embodiments and detail.
Figure 3:
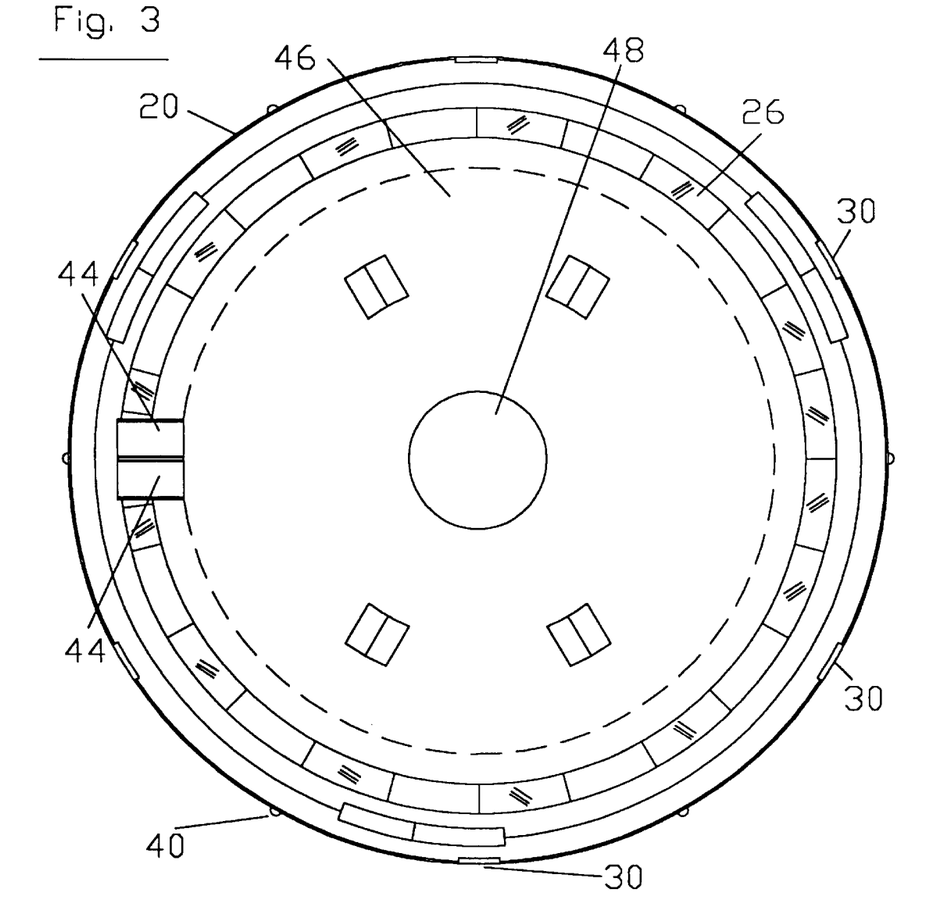
FIG. 3 shows a bottom view of a spherical levity aircraft design with some external embodiments and detail.
Figure 4:
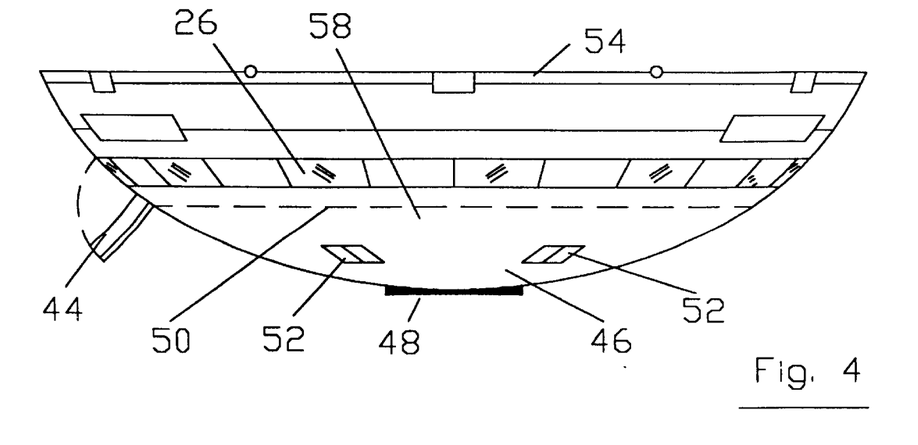
FIG. 4 shows a side elevation view of the bottom half of a spherical levity aircraft design and the lower half of a propulsion component atop the transport component with exterior embodiments and detail.
Figure 5:
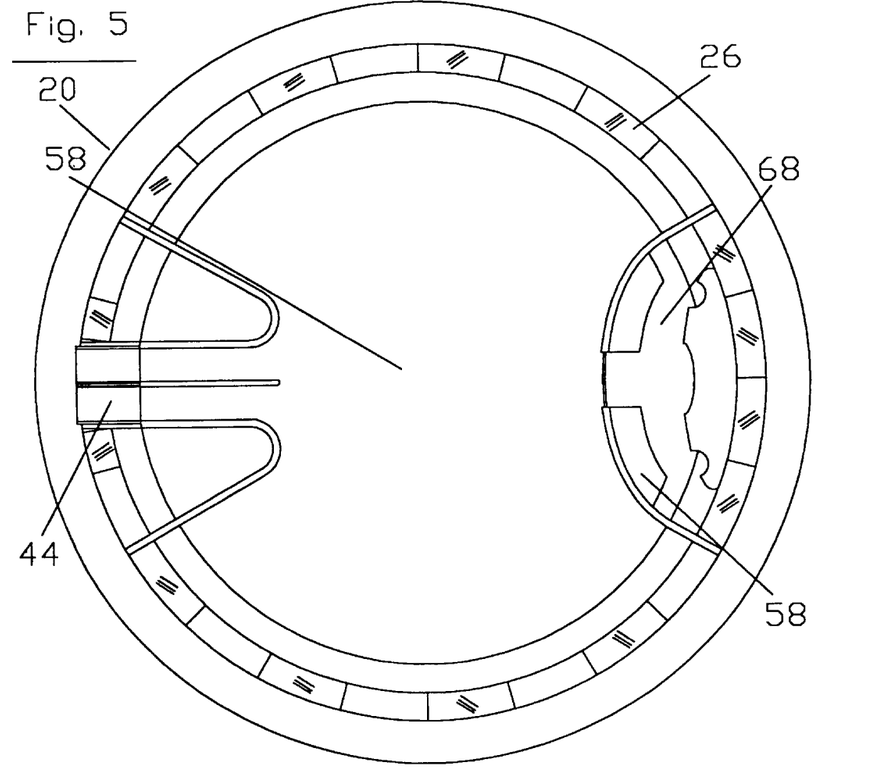
FIG. 5 shows a top horizontal cut-away of a passenger area within a transport component depicting the area for a user design.

With reference to the several drawings the art-work depicts a spherical levity aircraft design generally characterized by the reference number 20. As shown in FIG. 1, 2 and 3,the aircraft is spherical, by definition. The entire exterior sureface 20 is configured to disrupt the ambient air-flow over its sureface, during flight. The disrupted air-flow reduces skin-friction and drag, and like a golf-ball has improved air penetration and directional properties.

FIG. 6, 7, 9 and 10, are cut-away drawings that demonstrate the internal placement and locations of some of the components, relative to the stationary and moving parts. A lift component 22 is the top segment of the spherical aircraft 20 with an internal vertical air-duct 33–35 that extends upward and is attached to the compression pod 62 to the top of the lift component 22. At the top is an air-intake opening 32–34 located at the top horizontal center of the lift component 22. The propulsion component 60-62-64-66-30 are contained in the area above the well insulated ceiling 54 of the transport component 58 and the lower cargo compartment 46 just below the passenger area floor 50. The propulsion component 60-62-64-66-30 is structurally independent and not made a part of the transport component 58. A bearing fixture 78 is located below the compression pod 62 that contains the front part of the engines 60 and is a means to rotate the compression pod 62, the engines 60, and the vertica-air-duct 33–35 through three hundred sixty degrees clock-wise and counter-clockwise.

The ambient air inpute, to operate the engines 60 and the means of the ambient air supply to mix with the bleed-air from the engines 60–62 high-pressure-tap, is the ambient air ducted through the verticaal-air-duct 33–35. Within the turbojet engines 60 fuel is mixed with the compressed air, and ignited to produce thrust that exits into the combustion pod 64 and thence into the augmented power thrust-tubes 66. These thrust-tubes 66 extend to the outer circumference of the aircrafts 20 horizontal circumference spar 38. Attached to the thrust tubes 66 and contained within the spar 38 are the control baffles 30. The above means delivers the propulsion required to operate, fly, and control the spherical aircraft 20. To expand upon the art-work in FIG. 9 it has been detailed to show the operation and the containment of a baffle 30. In viewing the drawings, from left to right, the left drawing shows engine thrust 80 being deflected downward 82. This downward deflection applies vertical pressure to raise that segment of the aircraft 20 during flight, the center drawing shows a baffle 30 with the baffle 30 deflector blades 82–84 closed to check the thrust, the right drawing shows a control baffle 30 configured and contained within the horizontal circumference spar 38 and pivot points 88 as the means to control and rotate each blade 82–84 within the baffle 30.

FIG. 1, 3, 4,5 and 6, represents art-work showing several views which make references to the transport component 24–58, the bottom third of the aircraft 20–22. Windows 26 viewed from the outside of the aircraft 20–22 are configured to contain the pressurized air within the transport component 24. Windows 26 are located to conform the spherical shape of the aircraft 20 they are flush with the exterior 22. Air-stair doors 44 open to become stairs and a ramp 44 from the passenger area 58. The air-freight and baggage area 46 is located beneith the passenger area 58 that close with flush access doors 52. The entire transport component 24-58-46 is a pressurized component. The transport component 24 is detachable where as to gain access into the interior of the aircraft for internal maintenance procedures on the propulsion components 60-62-64-66-30 and the lift component 22. The electro-hydraulic landing struts 28 are controlled to lengthen or shorten. By this means the aircraft 20 can be lowered to the ground level or raised. The air-stair door and ramp 44 can be used for ingress or egress without ground support, or during an emergency. The large passenger area 58 can be user designed. A flight control center 68 can be placed into an area susceptible to its operation. The landing struts 28 can be activated to level the aircraft 20, after landing. The struts 28 can either lower or raise the aircraft 20 when it is firmly on the ground. The landing struts 28 are not made a part of the transport component 24–58 and are configured into the spherical triangular spars 38–70. The landing struts 28 retract into an enclosure covered for flight, and extend for landing.

FIG. 1, 2, 3 and 4, shows the placement of strobe lights 36 at the exterior top of the lift component 22. Red or green navigation lights 40 are shown each sixty degrees around the mid-horizontal-circumference spar 38. These lights 40 are coordinated to show the direction of flight during night operations, as a safety item. The spherical aircraft 20 has neither a fabricated front nor rear, and can fly in any compass-card direction using the internal guidance system as the means of direction change. Placed alternately with the navigation lights 40 around the circumference spar 38, are the locations for the baffle-box-frames72. Landing lights and other required lighting can be placed on the bottom portion of the spherical aircraft 20.

Figure 6:
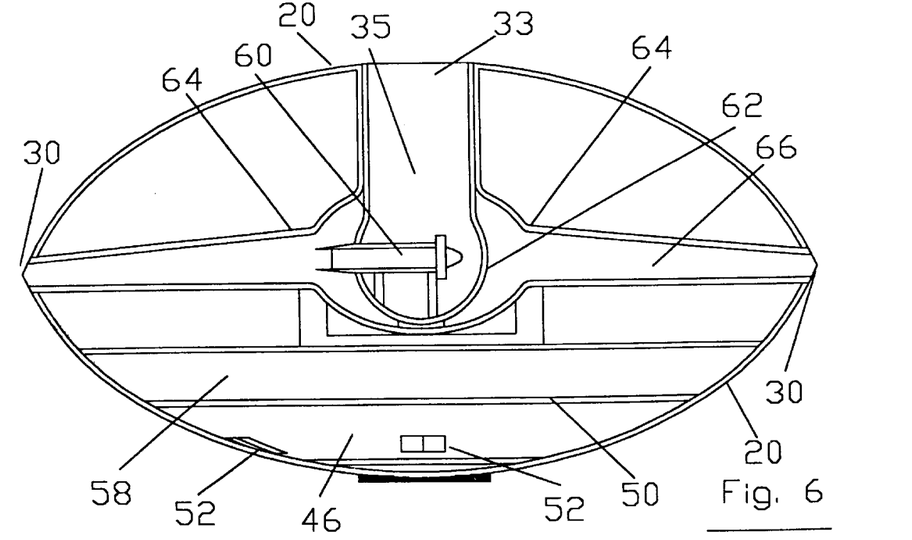
FIG. 6 shows a vertical cut-away of a spherical levity aircraft design showing components and their relative positions, as viewed from top to bottom; a lift component, a propulsion component containing engines, two pods, and a vertical air-duct, and horizontal thrust tubes, a passenger area and a cargo area.
Figure 7:
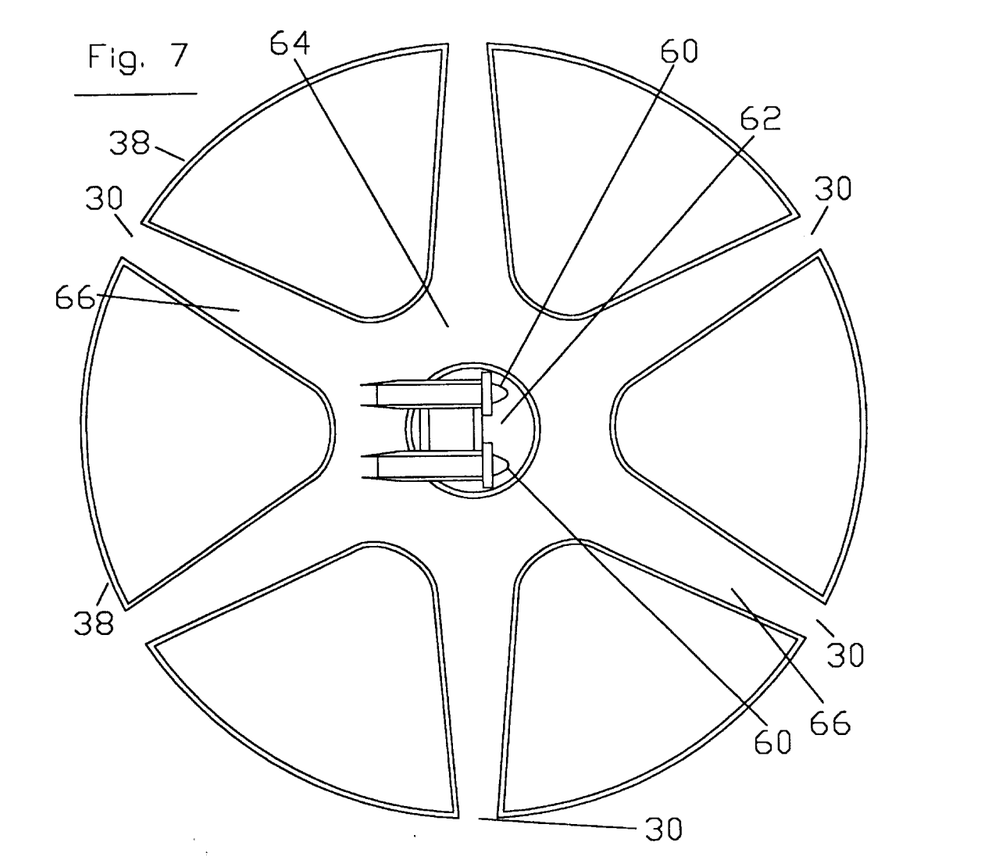
FIG. 7 shows a horizontal cut-away of a propulsion component that is located in that portion of FIG. 6 with embodiments and detail.
Figure 8:
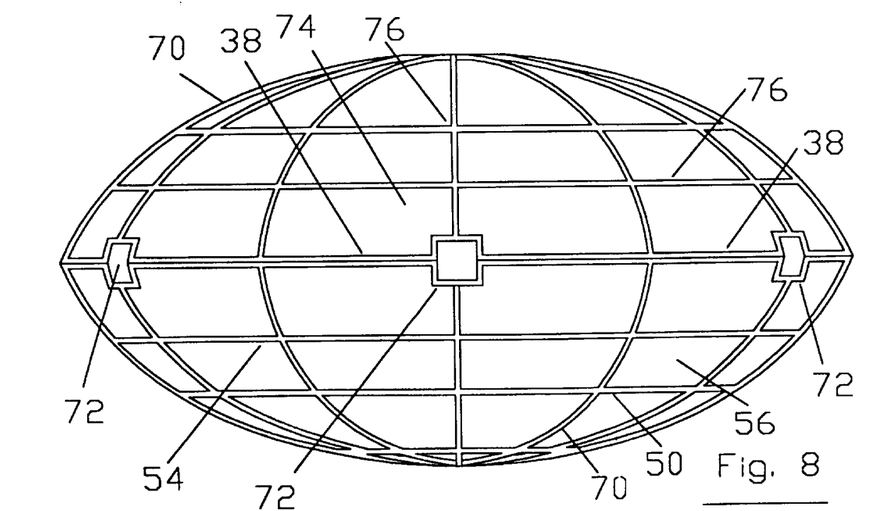
FIG. 8 shows a side elevation of a spherical levity aircraft design that demonstrates oblique spherical triangular spars assembled to form the horizontal circumference spar with embodiments and detail.
Figure 9:
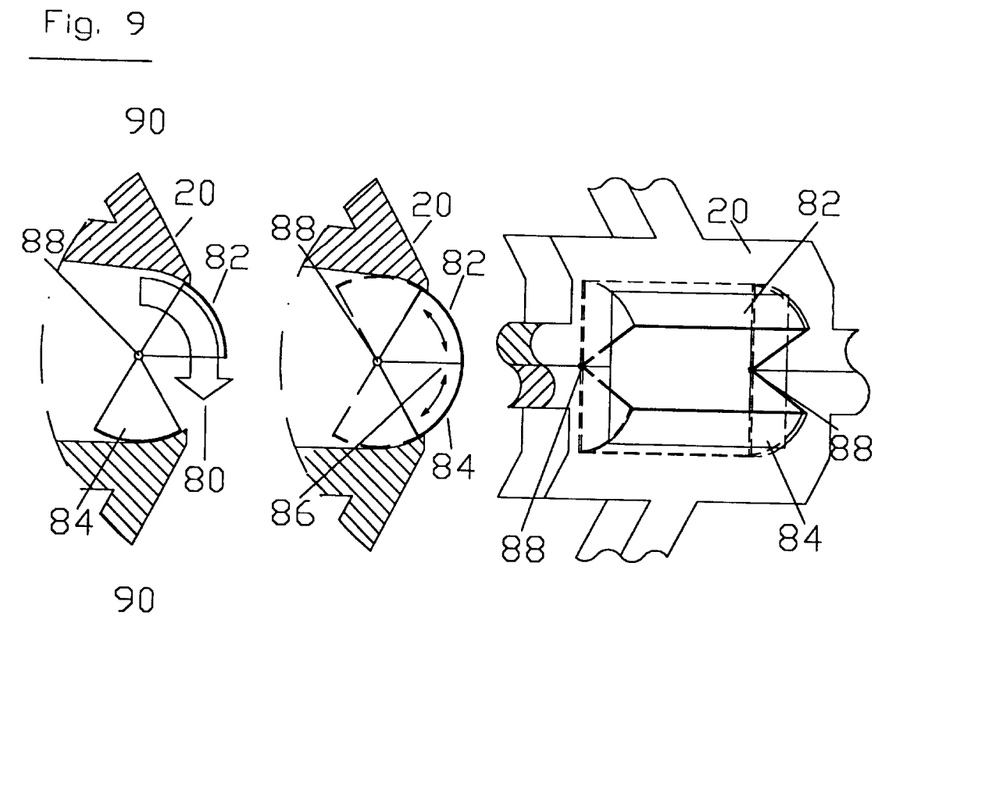
FIG. 9 shows three cut-away expanded baffle views, detailing from left to right; a side view deflecting engine thrust, a side view closed to stop engine thrust quarter front view as positioned within the horizontal spar with embodiments and detail.
Figure 10:
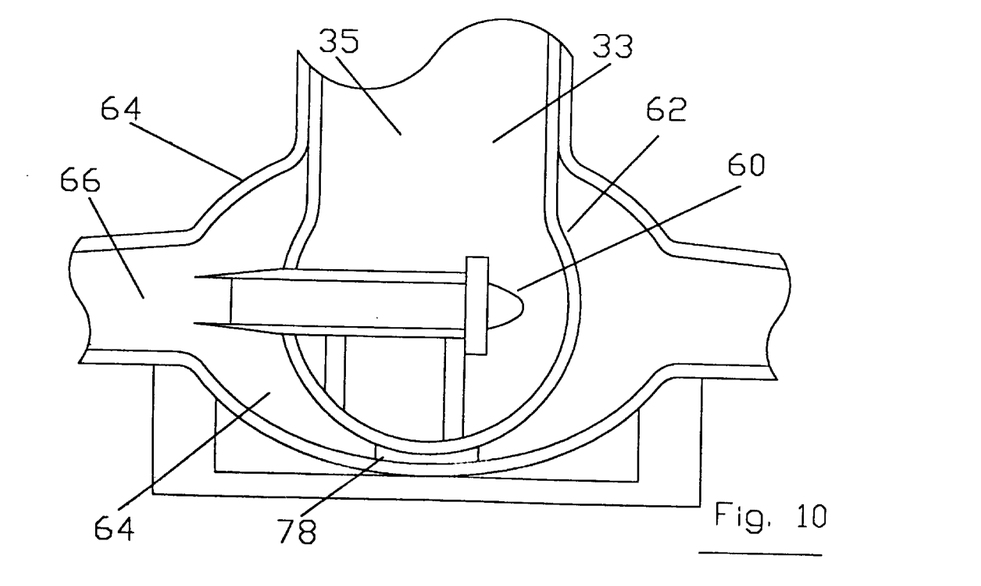
FIG. 10 shows an expanded vertical cut-away within the propulsion component showing engines as they are located within the inner and outer containment pods with embodiment and detail.

FIG. 6, 7 and 8, shows oblique-spherical-triangular spars 70, configured to form the mid-horizontal-circumference spar 38, and the baffle-box-frames 72. Spar 38 with the baffle-box-openings 72 indicate the locations of the flight control baffles 30. These are attached to the augmented-power-thrust tubes 66. The art-work shows horizontal spars 76 with other horizontal floor 50 area, and horizontal ceiling 54 members. Other horizontal members throughout, are entities that add strength and stability to the frame 70 of the aircraft 20. With regard to the transport component, it can be configured for many purposes and accordingly, the scope of the invention should be determined, not by the embodiment illustrated, but by the appended claims and their legal equivalents.

The spherical aircraft herein describes a multi-purpose machine for flight with automated means to means to transport. Although its description is simplistic, this should not be construed as limitations of the scope of the invention but as an exemplification of the preferred embodiments. It is recognized, however, that departures may be made therefrom within the scope of the invention and that various modifications will occur with persons skilled in the arts.

What is claimed is:

1. A spherical aircraft including:
   a spherical fuselage, the fuselage including an outer surface, said outer surface having an outer skin pattern means that disrupts the airflow over the outer surface, the fuselage including an upper section, a center section, and a lower section;
   a propulsion system including; turbojet engines; an air intake duct; a compression pod; and a combustion pod, wherein hot air from the compression pod provides lift, and propulsion thrust from the combustion pod provides thrust for the aircraft;
   directional control means including a flight control center with extensions from a flight computer, stabilization gyros that continually balance the aircraft; and control baffles that are located at the periphery of the center section of the aircraft, said control baffles receive signals, through the flight control center, from the gyros for attitude, altitude, and directional control;
   and landing struts with means to level, raise, and lower, the fuselage when extended and in a landed configuration.

2. The spherical aircraft of claim 1 wherein the landing struts are retractable.

3. The spherical aircraft of claim 2 wherein the landing struts include electro-hydraulic telescoping struts.

4. The spherical aircraft of claim 1 wherein hot air from the compression pod is channeled through pressurization units into a pressurized section of the aircraft.

5. The spherical aircraft of claim 4 wherein air in the pressurized section is derived from a combination of an oxygen system, an isobaric control, and a differential control, said pressurized section receives high temperature compressed air from the engine high-pressure-tap and ambient air from the air-duct.

6. The spherical aircraft of claim 1 wherein the baffles are made from titanium.

7. The spherical aircraft of claim 1 wherein the baffles receive thrust from tubes located within the center section of the aircraft that are linked with the thrust from the engines wherein each tube is augmented for additional thrust.

8. The spherical aircraft of claim 1 wherein the engines are located in the center of the center section of the aircraft, and are rotatable for directional control while the airframe maintains an attitude of horizontal.

9. The spherical aircraft of claim 8 wherein the baffles are made from titanium.

10. The spherical aircraft of claim 8 wherein the baffles receive thrust from tubes located within the center section of the aircraft that are linked with the thrust from the engines and augmented for additional thrust.

11. The spherical aircraft of claim 1 wherein a fuselage includes a pressurized passenger compartment located between the lower and the center section of the aircraft.

12. The spherical aircraft of claim 11 wherein air in the pressurized section is a combination of an oxygen system, an isobaric control, and a differential control, with high temperature compressed air from the engine high-pressure-tap, and ambient air from the air-duct.

13. A spherical aircraft including:

- a spherical fuselage, the fuselage including an outer surface; an upper section; a center section; and a lower section;
- a propulsion system including: turbojet engines, an air intake duct; a compression pod and a combustion pod; wherein hot air from the compression pod provides lift, and propulsion thrust from the combustion pod provides thrust for the aircraft;
- directional control means including a flight control center with extensions from a flight computer, stabilization gyros that continually balance the aircraft, said control baffles receive signals, through the flight control center, from said gyros for attitude, altitude, and directional control;
- and landing struts with means to level, raise, and lower, the fuselage, when extended and in a landed configuration.

14. The spherical aircraft of claim 13 wherein the landing struts means are electro-hydraulic telescoping struts.

* * * * *